(12) United States Patent
Houk

(10) Patent No.: US 8,992,068 B2
(45) Date of Patent: Mar. 31, 2015

(54) APPARATUS FOR DE-AIRING MATERIAL IN AN EXTRUDER THAT INCLUDES A VENT BLOCK

(71) Applicant: The Bonnot Company, Uniontown, OH (US)

(72) Inventor: Kurt G. Houk, Stow, OH (US)

(73) Assignee: The Bonnot Company, Uniontown, OH (US)

( * ) Notice: Subject to any disclaimer, the term of this patent is extended or adjusted under 35 U.S.C. 154(b) by 0 days.

(21) Appl. No.: 14/483,666

(22) Filed: Sep. 11, 2014

(65) Prior Publication Data

US 2014/0377396 A1 Dec. 25, 2014

Related U.S. Application Data

(62) Division of application No. 13/306,368, filed on Nov. 29, 2011.

(60) Provisional application No. 61/418,631, filed on Dec. 1, 2010.

(51) Int. Cl.
*B29B 7/84* (2006.01)
*B29C 47/76* (2006.01)
*B29C 47/50* (2006.01)

(52) U.S. Cl.
CPC ............... *B29C 47/763* (2013.01); *B29C 47/50* (2013.01)
USPC ................................ 366/75; 366/89; 425/203

(58) Field of Classification Search
CPC .... B29C 47/76; B29C 47/762; B29C 47/763; B29C 47/765; B29C 47/766; B29C 47/767
USPC ............ 366/75, 79, 83–85, 143, 89; 425/203, 425/204, 208, 209; 96/11
See application file for complete search history.

(56) References Cited

U.S. PATENT DOCUMENTS 3,217,783 A * 11/1965 Rodenacker .................... 159/2.2
3,371,379 A * 3/1968 Reifenhauser .................. 96/196

(Continued)

FOREIGN PATENT DOCUMENTS

DE 19516082 A1 * 11/1996 .............. B29C 47/76
EP 2218568 A1 * 8/2010 .............. B29C 47/76

(Continued)

*Primary Examiner* — Charles Cooley
(74) *Attorney, Agent, or Firm* — Fay Sharpe LLP

(57) ABSTRACT

An extruder for feeding material and for removing gas from the fed material. The extruder includes a vent block positioned between a first and second auger. The vent block including a vent cavity having a feed end and an exit end, an inner feed ring that partially extends into said vent cavity at the feed end of the vent cavity, and a screw element rotatably positioned in the vent cavity. A front portion of the outer ring is longitudinally aligned with or overlapping the front end of the inner feed ring. The outer ring forms at least one gap or opening at or adjacent the feed end of the vent cavity to enable a vacuum to be pulled on the vent cavity as material is moved though the vent cavity from the feed end to the exit end by the screw element.

17 Claims, 5 Drawing Sheets

(56) References Cited

U.S. PATENT DOCUMENTS

| | | | |
|---|---|---|---|
| 3,410,938 A * | 11/1968 | Schippers | 264/102 |
| 3,572,647 A * | 3/1971 | Staheli | 366/75 |
| 4,130,901 A * | 12/1978 | Borovikova et al. | 366/75 |
| 4,260,264 A * | 4/1981 | Maki et al. | 366/75 |
| 4,578,455 A * | 3/1986 | Pipper et al. | 528/501 |
| 6,367,960 B2 * | 4/2002 | Yamazaki et al. | 366/149 |
| 6,422,732 B1 * | 7/2002 | Maris | 366/75 |
| 7,607,817 B2 * | 10/2009 | Samann et al. | 366/75 |
| 8,360,627 B2 * | 1/2013 | Stirner | 366/75 |
| 2006/0034962 A1 * | 2/2006 | Guntherberg et al. | 425/208 |
| 2008/0248152 A1 * | 10/2008 | Samann et al. | 425/208 |
| 2010/0202243 A1 * | 8/2010 | Stirner | 366/139 |
| 2012/0139147 A1 * | 6/2012 | Houk | 264/102 |

FOREIGN PATENT DOCUMENTS

| | | | | |
|---|---|---|---|---|
| GB | 1126193 A * | 9/1968 | | |
| JP | 09262830 A * | 10/1997 | | B29B 7/84 |
| JP | 11245283 A * | 9/1999 | | B29C 47/76 |
| JP | 11300811 A * | 11/1999 | | B29C 47/38 |
| JP | 2002210805 A * | 7/2002 | | B29C 47/10 |
| JP | 2003071831 A * | 3/2003 | | B29B 7/84 |
| JP | 2010184297 A * | 8/2010 | | |
| JP | 2010253804 A * | 11/2010 | | |
| JP | 2011224862 A * | 11/2011 | | |

\* cited by examiner

APPARATUS FOR DE-AIRING MATERIAL IN AN EXTRUDER THAT INCLUDES A VENT BLOCK

The present invention is a divisional of U.S. application Ser. No. 13/306,368 filed Nov. 29, 2011, which in turn claims priority on U.S. Provisional Application Ser. No. 61/418,631 filed Dec. 1, 2010, which is fully incorporated herein by reference.

The present invention is a device used to remove gas and/or moisture from a material being processed by an extruder.

BACKGROUND OF THE INVENTION

Many types of materials that are processed in an extruder can include entrapped air and/or other types of gasses. The entrapped air and/or other types of gasses can interfere with the proper processing of the materials in the extruder. Various arrangements have been developed to remove air and/or other types of gasses during the processing of materials in the extruder. Non-limiting examples of such arrangements are disclosed in U.S. Pat. Nos. 2,833,750; 2,944,047; 3,040,005; 3,156,009; 3,177,272; 3,799,234; 3,870,284; 3,985,348; 4,065,532; 4,100,244; 4,127,635; and 4,155,655, all of which are incorporated herein by reference.

Many prior art extruder systems that include a venting arrangement are used to extrude polymer materials. Polymer materials, when being extruded through the extruder, are generally in a fluid form that enables the polymer to easily flow through the extruder. Typically an opening is formed in the barrel of the extruder and gas (e.g., air, nitrogen, water vapor, etc.) is removed from the extruder as the polymer is moved through the extruder. A diverter is commonly placed at or near the opening in the barrel to inhibit or prevent the polymer from flowing into the opening and plugging the opening.

It has been found that materials that are more viscous than polymers, such as clays, mastics, ceramics and the like have a tendency to plug the opening in the barrel even when a diverter is used. As such, standard extruder arrangements that include a venting system cannot be used with highly viscous materials.

In view of the current state of the art of extruders, there is a need for an extruder arrangement that can be used to remove gas from the extruder when extruding various types of materials, and especially highly viscous materials.

SUMMARY OF THE INVENTION

The present invention is directed to an improved extruder arrangement that overcomes the past problems associated with prior art extruders that require a vacuum to be pulled on the material being feed through the extruder. The improved extruder arrangement is particularly useful in extruding highly viscous and dense materials that require a vacuum to be pulled on the highly viscous materials as the highly viscous materials are fed through the extruder and will be described with particular reference thereto; however, it will be appreciated that less viscous material can be extruded through the improved extruder arrangement. As defined herein, a highly viscous material is a material that has a viscosity of 20,000 cP or greater at 25° C. The extruder generally includes an auger or screw that is rotated in a cavity that is formed by a cylinder or one or more barrel liners. The cross-sectional shape of the cavity is generally circular or oval; however, the cavity can have other cross-sectional shapes. The auger or screw includes a root and one or more flights on the outer surface of the root. The root can be partially or fully hollow, or can be solid. The flight height and flight angle on the screw is non-limiting. The diameter of the root of the auger or screw is non-limiting. The length of the auger or screw is non-limiting. The pitch of the one or more flights on the auger or screw is non-limiting. Many different auger or screw configurations can be used on the improved extruder arrangement of the present invention. Examples of some non-limiting screw configurations are disclosed in U.S. Pat. Nos. 3,870,284; 3,989, 941; 4,129,386; and 4,321,229, which are incorporated herein by reference. One or more motor and gear boxes can be used to control the rotational speed of the auger or screw. A feed box can be optionally used to feed material to the auger or screw; however, this is not required. Generally the auger or screw is fed with material at the beginning or at the first stage of the auger or screw; however, one or more materials can be alternatively or additionally fed at other locations along the auger or screw (e.g., second state, third state, etc.). A cooling system (e.g., cooling fluid, etc.) and/or heating system (e.g., warm or hot fluid, heating coils, heating jacket, etc.) can be used to heat and/or cool the material being fed through the extruder; however, this is not required. The cooling system and/or heating system, when used, can be positioned at one or more positions along the length of the extruder. The extruder can include a die plate and die plate holder system; however, this is not required. The die plate, when used, is used to form specifically shaped extrusions; however, this is not required. The die plate, when used, can include one or more openings. The one or more openings in the die plate can optionally include one or more interests; however, this is not required.

In one non-limiting aspect of the invention, the improved extruder arrangement of the present invention includes a novel vent block that is used to draw gas such as, but not limited to, air from a material as the material is being feed through the extruder. The extruder can include one or more vent blocks positioned along the length of the auger or screw. Generally one vent block is positioned between the first and second stage of the extruder; however, this is not required. As can be appreciated, the vent block can be positioned is other or alternative locations (e.g., between feeder and first stage of extruder, between second and third stage of extruder, in first stage of extruder, in second stage of extruder, in third stage of extruder, etc.). The different stages include the feeding section (first stage), a transition section (second stage), metering section (third stage), and mixing section (forth stage). The transition section, metering section, and optional mixing section can also be combined into a single stage commonly referred to as the compression stage. The vent block is not limited in shape, size, or length. The components of the vent block are generally formed of durable materials (e.g., metal, plastic, composite materials, ceramic, etc.). The various components of the vent block can be formed of the same or different materials. The vent block includes a feed arrangement that enables material to be fed into a vent cavity and enables a vacuum to be pulled at a vacuum section that is located at or adjacent to the feed arrangement while minimizing or preventing material from flowing into the vacuum section. The vacuum section and feed arrangement used in the vent block enables both highly viscous materials and non-highly viscous materials to flow through the vent block while a vacuum is pulled on the materials passing through the vent block. In one non-limiting embodiment of the invention, the feed arrangement includes an inner feed ring that extends into the vent cavity of the vent block from the feed wall of the vent block. The inner feed ring is generally connected to or integrally formed with the feed wall of the vent block; however, this is not required. As can be appreciated, the one or more portions of the inner feed ring can be connected to other or additional components of the vent block (e.g., side walls, top wall, bottom wall, outer ring, etc.); however, this is not required. The inner feed ring can be formed of one or more pieces. The cross-sectional size and cross-sectional shape of the inner feed ring are generally the same as or similar to the cavity of the barrel or feeder section that is connected to the vent block and causes material to be moved toward or into the vent block; however, this is not required. For example, if the vent block was connected after the first stage of the extruder, then the cross-sectional size and cross-sectional shape of the opening at the end of the barrel or formed by a plurality of barrel liners are the same or similar to the cross-sectional size and cross-sectional shape of the inner feed ring of the vent block. The cross-sectional size and/or cross-sectional shape of the inner feed ring can be constant or change (e.g., increase, decrease, circular to oval, oval to circular, circular to polygonal, oval to polygonal, etc.) along the longitudinal length of the inner feed ring. The amount that the inner feed ring extends into the vent cavity is non-limiting. Generally, the inner feed ring extends no more than about 50% the total longitudinal length of the vent cavity, typically no more than about 25% the total longitudinal length of the vent cavity, more typically no more than about 25% the total longitudinal length of the vent cavity, still typically no more than about 15% the total longitudinal length of the vent cavity, and still more typically no more than about 12% the total longitudinal length of the vent cavity. In another and/or alternative non-limiting embodiment of the invention, the vacuum section is at least partially formed by an outer ring; however, this is not required. In one non-limiting configuration, the outer ring defines all or a majority of the inner surface vent cavity. The outer ring can be formed of one or more pieces. The cross-sectional size and/or cross-sectional shape of the outer ring can be constant or change (e.g., increase, decrease, circular to oval, oval to circular, circular to polygonal, oval to polygonal, etc.) along the longitudinal length of the outer ring. As such, the vent cavity that is fully or partially defined by the inner surface of the outer ring can have a constant or variable cross-sectional size and/or cross-sectional shape along the longitudinal length of the vent cavity. The outer ring is generally connected to the exit wall of the vent block; however, this is not required. The outer ring can also or alternatively be connected to the feed wall of the vent block; however, this is not required. As can be appreciated, the one or more portions of the outer ring can be connected to other or additional components of the vent block (e.g., side walls, top wall, bottom wall, etc.); however, this is not required. The outer ring generally extends about 70-100% of the length between the exit wall and feed wall of the vent block, typically extends about 80-100% of the length between the exit wall and feed wall of the vent block, more typically extends about 85-100% of the length between the exit wall and feed wall of the vent block, even more typically extends about 90-100% of the length between the exit wall and feed wall of the vent block, and still even more typically extends about 94-100% of the length between the exit wall and feed wall of the vent block. The outer ring includes one or more openings and/or forms one or more opening with the feed wall of the vent block to enable gas to be drawn out of the vent cavity of the vent block. In one non-limiting design, one or more portions of the outer ring are spaced from the feed wall of the vent block to form one or more gas gaps between the one or more portions of the outer ring and the feed wall. In one non-limiting arrangement, the complete outer ring is spaced from the feed wall. In another non-limiting arrangement, a portion of the outer ring is spaced from the feed wall and a portion of the outer ring contacts the feed wall, connects to the feed wall and/or is interconnected to the feed wall. In still another non-limiting arrangement, when all or a portion of the outer ring is spaced from the feed wall, the spacing of the outer ring from the feed wall is less than or equal to the distance that the inner feed ring extends from the feed wall and into the vent cavity. In such an arrangement, the end of the outer ring that forms the gap with the feed wall either is aligned with the end of the inner feed ring or overlaps the inner feed ring. Generally, the end of the outer ring that forms the 0 gap with the feed wall overlaps about 1-99% of the inner feed ring, typically overlaps about 10-99% of the inner feed ring, more typically overlaps about 20-95% of the inner feed ring, still more typically overlaps about 25-95% of the inner feed ring, even more typically overlaps about 30-95% of the inner feed ring, still even more typically overlaps about 50-95% of the inner feed ring, and yet even more typically overlaps about 50-95% of the inner feed ring. In still yet another non-limiting arrangement, when the outer ring contacts the feed wall, connects to the feed wall and/or is interconnected to the feed wall and includes one or more openings in the outer ring for removal of gas from the vent cavity, the one or more openings either are aligned with the end of the inner feed ring or overlaps the inner feed ring. Generally, the one or more openings in the outer ring overlap about 1-99% of the inner feed ring, typically overlaps about 10-99% of the inner feed ring, more typically overlaps about 20-95% of the inner feed ring, still more typically overlaps about 25-95% of the inner feed ring, even more typically overlaps about 30-95% of the inner feed ring, still even more typically overlaps about 50-95% of the inner feed ring, and yet even more typically overlaps about 50-95% of the inner feed ring.

In still another and/or alternative non-limiting aspect of the invention, the improved extruder arrangement of the present invention includes a novel vent block that has a specially configured screw element designed to rotate within the vent cavity of the vent block. The screw element includes a root portion and one or more flights that are connected to the outer surface of the root portion. The root portion can be partially or fully hollow, or can be solid. The flight height and/or flight angle on the screw element are non-limiting. The diameter of the root portion of the screw element is non-limiting. The cross-sectional size and/or shape of the root portion can be constant or can vary along the longitudinal length of the screw element. The flight height, flight angle and/or pitch of the one or more flights on the screw element can be constant or can vary along the longitudinal length of the screw element. The length of the screw element is generally the same length as the vent cavity of the vent block; however, it can be appreciated that the screw element can be longer than or shorter than the length of the vent cavity. In one non-limiting embodiment, the screw element can include an auger connection arrangement on one or both ends of the screw element; however, this is not required. The auger connection arrangement, when used, is configured to connect one or both ends of the screw element to an auger or screw of the extruder. The configuration of the auger connection arrangement is non-limiting. When an auger connection arrangement is used on both ends of the screw element, the auger connection arrangements can be the same or different. In one non-limiting configuration, at least a portion of the end of the root portion is hollow and includes one or more key structures (e.g., slot, grooves, etc.) to engage and align one or both ends of the screw element with the end of an auger or screw. In another and/or alternative non-limiting embodiment of the invention, the screw element includes one or more fingers; however, this is not required. The one or more fingers, when used, are generally connected to a portion of one or more flights on the screw element; however, it can be appreciated that one or more fingers can also or alternatively be connected to the root portion of the screw element. In one non-limiting configuration, the one or more fingers are positioned at or near the feed end of the screw element so that the one or more fingers can be designed to fully or partially clear material from a region wherein the inner feed ring and outer ring of the vent block are aligned and/or overlap one another; however, this is not required. Such a configuration of the one or more fingers can be used to clear material from the region wherein the inner feed ring and outer ring of the vent block are aligned and/or overlap one another so as to facilitate in clearing the one or more gas gaps or gas openings that are used to remove gas from the vent cavity. When the inner feed ring and outer ring overlap one another, the front end of one or more of the fingers is designed to be positioned at least partially between the inner feed ring and outer ring and to move within such space as the screw element rotates in the vent cavity; however, this is not required. Also, when the inner feed ring and outer ring overlap one another, the front end of one or more of the fingers is designed to be positioned at least partially between the inner feed ring and outer ring and positioned to pass adjacent to or partially or fully over the one or more gaps or openings and to move within the space between the inner feed ring and outer ring as the screw element rotates in the vent cavity; however, this is not required. Generally, the one or more fingers are positioned in about 1-100% of the longitudinal length of the overlay between the inner feed ring and outer ring, typically about 25-100% of the longitudinal length of the overlay between the inner feed ring and outer ring, more typically about 50-100% of the longitudinal length of the overlay between the inner feed ring and outer ring, and still more typically about 75-100% of the longitudinal length of the overlay between the inner feed ring and outer ring. Also or alternatively, the one or more fingers are generally positioned over about 1-100% of the longitudinal length of the gap or opening used to vent gas from the vent cavity, typically positioned over about 10-100% of the longitudinal length of the gap or opening used to vent gas from the vent cavity, more typically positioned over about 25-100% of the longitudinal length of the gap or opening used to vent gas from the vent cavity, still more typically positioned over about 40-100% of the longitudinal length of the gap or opening used to vent gas from the vent cavity, and even more typically positioned over about 50-100% of the longitudinal length of the gap or opening used to vent gas from the vent cavity. In another and/or alternative non-limiting configuration, the front of one or more fingers can be tapered or otherwise configured to cause material to be moved away from and/or out between the gap between the inner feed ring and outer ring; however, this is not required.

In yet another and/or alternative non-limiting aspect of the invention, the improved extruder arrangement of the present invention includes a vent block that has a vent cavity and/or screw element that are designed to cause a pressure drop as material is fed into the vent cavity; however, this is not required. The pressure drop is designed to limit or prevent material from flowing into the one or more gaps or openings in the vent cavity that are used to pull a vacuum on the vent cavity. The creation of a pressure drop can be achieved in one or more ways, such as, but not limited to, 1) creating a portion of the vent cavity having a larger cross-section size to the cross-section size of the opening in the inner feed ring, 2) reducing the root portion of the screw element as compared to the root of the auger or screw feeding material into the vent block, and/or 3) increasing the pitch of the one or more flights on the screw element as compared to the flight pitch of the auger or screw feeding material into the vent block.

In still yet another and/or alternative non-limiting aspect of the invention, the improved extruder arrangement of the present invention includes a vent block that includes one or more viewing windows to enable a user to view the interior of the vent cavity to determine whether one or more gaps or openings used to vent gas from the vent cavity are clear or plugged; however, this is not required.

In another and/or alternative non-limiting aspect of the invention, the improved extruder arrangement of the present invention includes a vent block that includes one or more doors that enable a user to access the vent cavity and/or interior of the vent block; however, this is not required. The one or more doors can include a sealing arrangement (e.g., sealing strip, sealing ring, etc.) to form a partial or full airtight seal with the door frame when the door is closed; however, this is not required.

It is one non-limiting object of the present invention to provide an extruder arrangement that can remove gas from material that is being fed through the extruder.

It is another and/or alternative non-limiting object of the present invention to provide an extruder arrangement that includes a vent block that is used to remove gas from material that is being fed through the extruder.

It is still another and/or alternative non-limiting object of the present invention to provide an extruder arrangement that includes a vent block having an inner feed ring and an outer ring and which rings are used to enable gas to be removed from a vent cavity while material is fed through the vent cavity and to inhibit or prevent material from moving into and/or clogging one or more gaps or openings that are used to remove gas from the vent cavity.

It is yet another and/or alternative non-limiting object of the present invention to provide an extruder arrangement that includes a vent block that includes a screw element having one or more fingers that are used to inhibit or prevent material from moving into and/or clogging one or more gaps or openings that are used to remove gas from the vent cavity.

It is still yet another and/or alternative non-limiting object of the present invention to provide an extruder arrangement that includes a vent block that includes one or more viewing windows to enable a user to determine whether one or more gaps or openings that are used to remove gas from the vent cavity are clogged or unclogged.

These and other objects and advantages will become apparent to those skilled in the art upon reading and following the description taken together with the accompanying drawings.

BRIEF DESCRIPTION OF THE DRAWINGS

Reference may now be made to the drawings which illustrate various preferred embodiments that the invention may take in physical form and in certain parts and arrangement of parts wherein.

DETAILED DESCRIPTION OF ONE NON-LIMITING EMBODIMENTS

Figure 1:
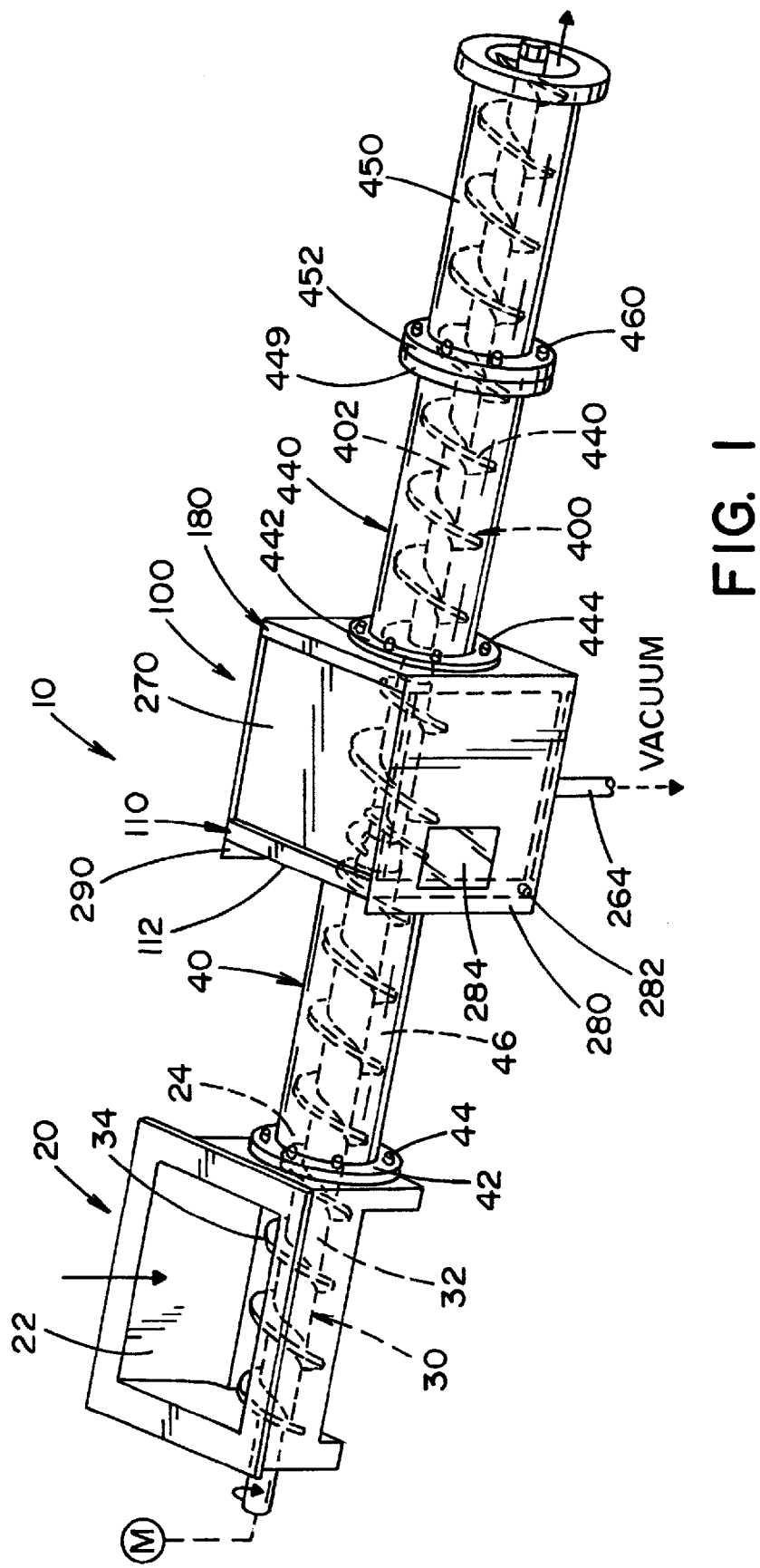
FIG. 1 is a side elevation view of an extruder arrangement in accordance with the present invention.

Referring now to the drawings wherein the showings are for the purpose of illustrating one non-limiting embodiment of the invention only and not for the purpose of limiting same, FIGS. 1-4 illustrate one non-limiting embodiment of the extruder arrangement in accordance with the present invention. The extruder arrangement 10 is designed to remove one or more gasses (e.g., air, nitrogen, water vapor, volatiles, etc.) from the material being feed through the extruder arrangement. The one or more gasses can create gas bubbles in the final product and/or interfere with the proper extrusion of the final product, thus compromising the integrity and/or quality of the final product extruded from the extruder arrangement. The extruder arrangement 10 is particularly useful in the extrusion of highly viscous materials (e.g., clay materials, etc.) and will be described with particular reference thereto; however, it will be appreciated that materials that are not highly viscous can also be extruded through the extruder arrangement of the present invention. Highly viscous materials that require gas to be removed from the highly viscous material during extrusion pose special that do not exist for non-highly viscous materials. Specially, traditional vacuum openings used in the barrel liners cannot be used to draw gas from highly viscous material during the extrusion process. Highly viscous materials require a greater force and pressure to move the highly viscous material in the extruder arrangement. These greater forces and pressures result in the highly viscous material moving into traditional vacuum openings used in the barrel liners, thus plugging such openings. The extruder arrangement of the present invention overcomes these shortcomings of past extruder configurations by the use of a novel vent block 100 that is positioned in one or more locations along the extruder arrangement. FIG. 1 illustrates that only a single vent block is used in the extruder arrangement, however, it can be appreciated that more than one vent block can be used in the extruder arrangement. As will be described in more detail below, the novel vent block of the present invention is designed to remove gas from highly viscous material being fed through the extruder arrangement while overcoming past problems associated with the plugging or clogging of the one or more openings used to draw gas from the highly viscous material as it moves through the extruder arrangement.

Referring again to FIG. 1, the extruder arrangement 10 includes a material feeder or chute 20 used to feed material into the extruder arrangement. The feeder 20 includes an opening 22 designed to receive material such as a highly viscous material (e.g., clay material, etc.) as indicated by the arrow. The use of a material feeder is not required. The size and configuration of the material feeder is non-limiting. The material used to form the material feeder is also non-limiting.

Once a material is fed into the material feeder, the material contacts the front end portion of a first auger 30. The first auger includes a central root portion 32 and one or more flights 34 connected to the outside surface of the root portion. The flight 34 has a helical configuration and is designed to move material in the material feeder out of the material feed through a feeder exit opening 24 and into a first barrel liner section 40. The first auger is generally rotated clockwise by a motor M as indicated by the arrow; however, it can be appreciated that the first auger can be rotated counterclockwise. A gear box, not shown, can be used in conjunction with the motor to control the speed of rotation of the first auger; however, this is not required. The diameter of the root portion of the first auger is non-limiting. The diameter or the root portion can remain constant or vary along the longitudinal length of the first auger. The height and/or pitch of the one or more flights on the auger can remain constant or vary along the longitudinal length of the first auger. The first auger can include one or more flight breaks along the longitudinal length of the first auger; however, this is not required.

Figure 2:
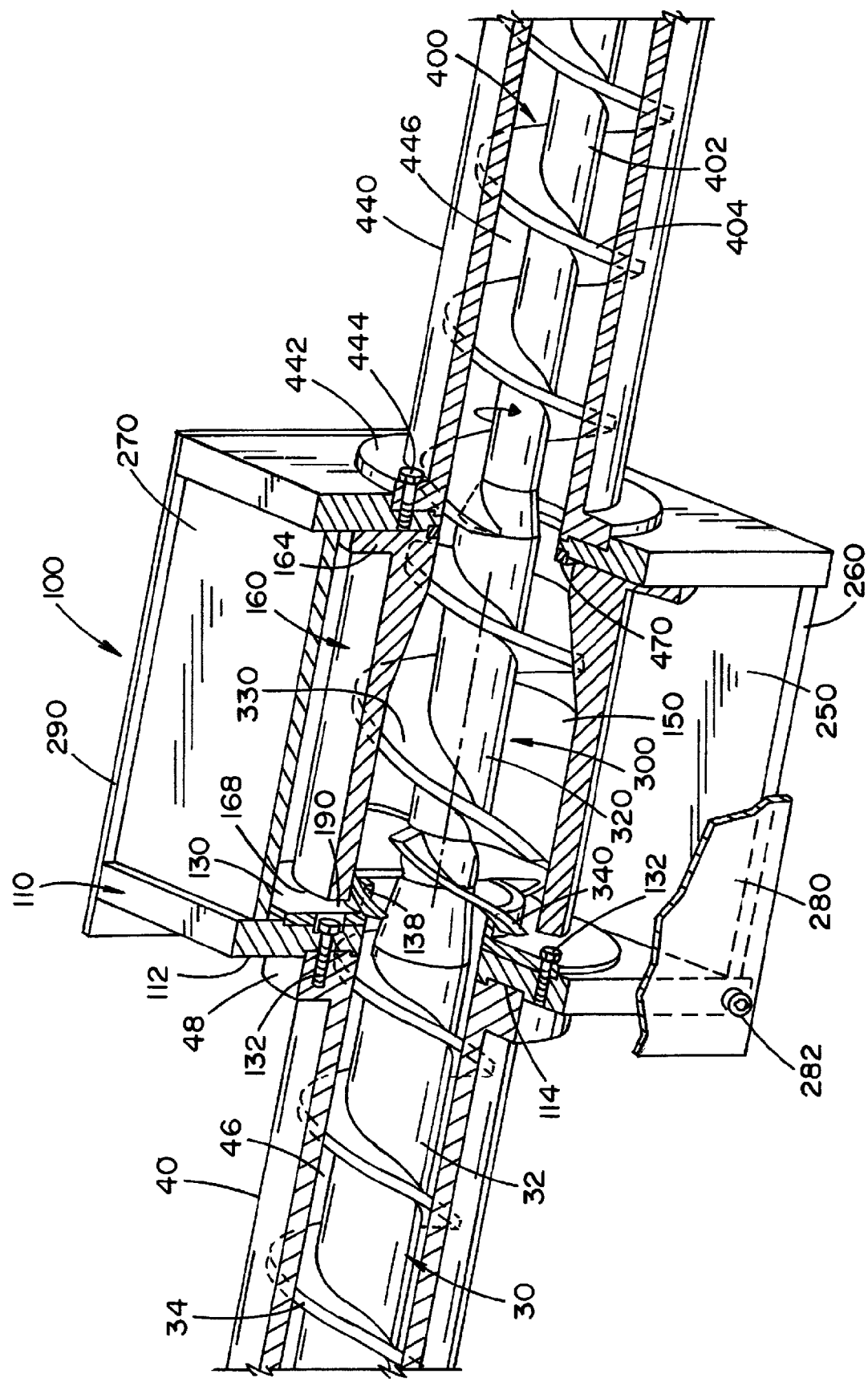
FIG. 2 is an enlarged side elevation view of a portion of the extruder arrangement of FIG. 1 showing the vent block connected between the first and second stage of the extruder.
Figure 3:
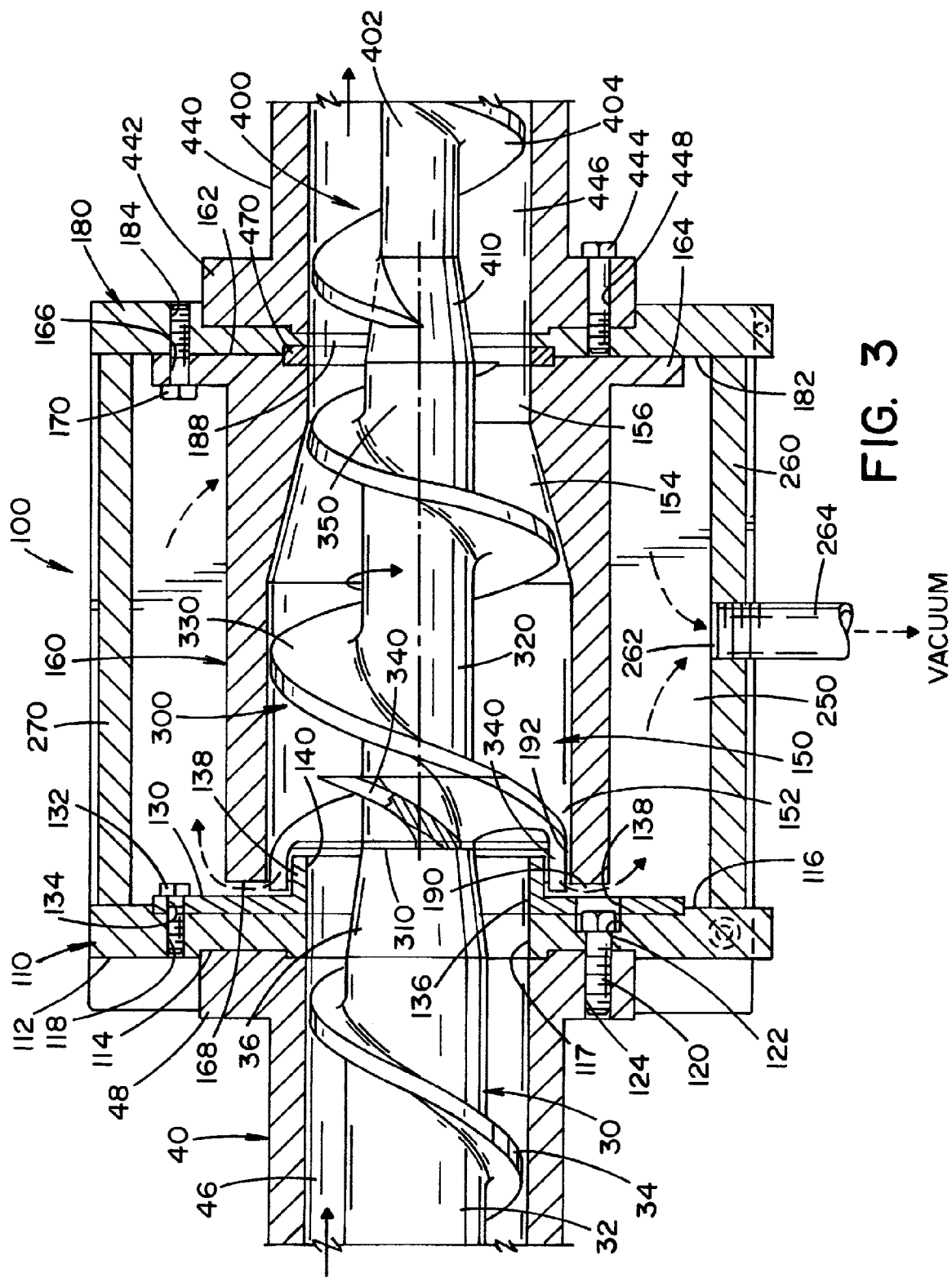
FIG. 3 is a side sectional view of the vent block.

First barrel liner 40 can be formed of one or more parts. Typically, the first barrel liner is formed of two halves that are bolted or otherwise connected together. The material used to form the first barrel liner is non-limiting. The first barrel liner includes a first flange 42 that is connected by bolts 44 or some other or additional connection arrangement (e.g., threaded connection, rivet, adhesive, etc.) to the material feeder. Although not shown, the first barrel liner can optionally include a heating and/or cooling jacket and/or coils to heat and/or cool the material moving though the first barrel liner. The cross-sectional size and cross-sectional shape of the cavity 46 formed by the first barrel liner can be constant or vary along the longitudinal length of the first barrel liner. The longitudinal length of the first barrel liner is non-limiting. The first barrel liner can be designed to enable two or more augers to rotate within the cavity of the first barrel liner; however, this is not required. As illustrated in FIG. 1, the cross-sectional size and circular cross-sectional shape of the cavity formed by the first barrel liner is generally constant along the longitudinal length of the first barrel liner. Referring now to FIGS. 1-3, a second flange 48 on the first barrel liner is connected to the vent block 100 by bolts or some other or additional connection arrangement. As best illustrated in FIG. 3, a bolt 120 is used to secure the first barrel liner to the feed wall of the vent block. The head of bolt 120 is illustrated as positioned in a bolt head recess 122 on the inner surface 116 of the feed wall; however, this is not required. The body of bolt 120 passes through a bolt opening 124 and is secured to second flange 48 on the first barrel liner. As can be appreciated, other or additional arrangements can be used to secure the first barrel liner to the vent block. As illustrated in FIG. 3, the head of bolt 122 passes partially or fully through an opening 138 in the inner feed ring; however, this is not required. As can be appreciated, the inner feed ring can be designed so that bolt 122 partially or fully secures the inner feed ring to the inner surface 116 of the feed wall of the vent block; however, this is not required.

Figure 4:
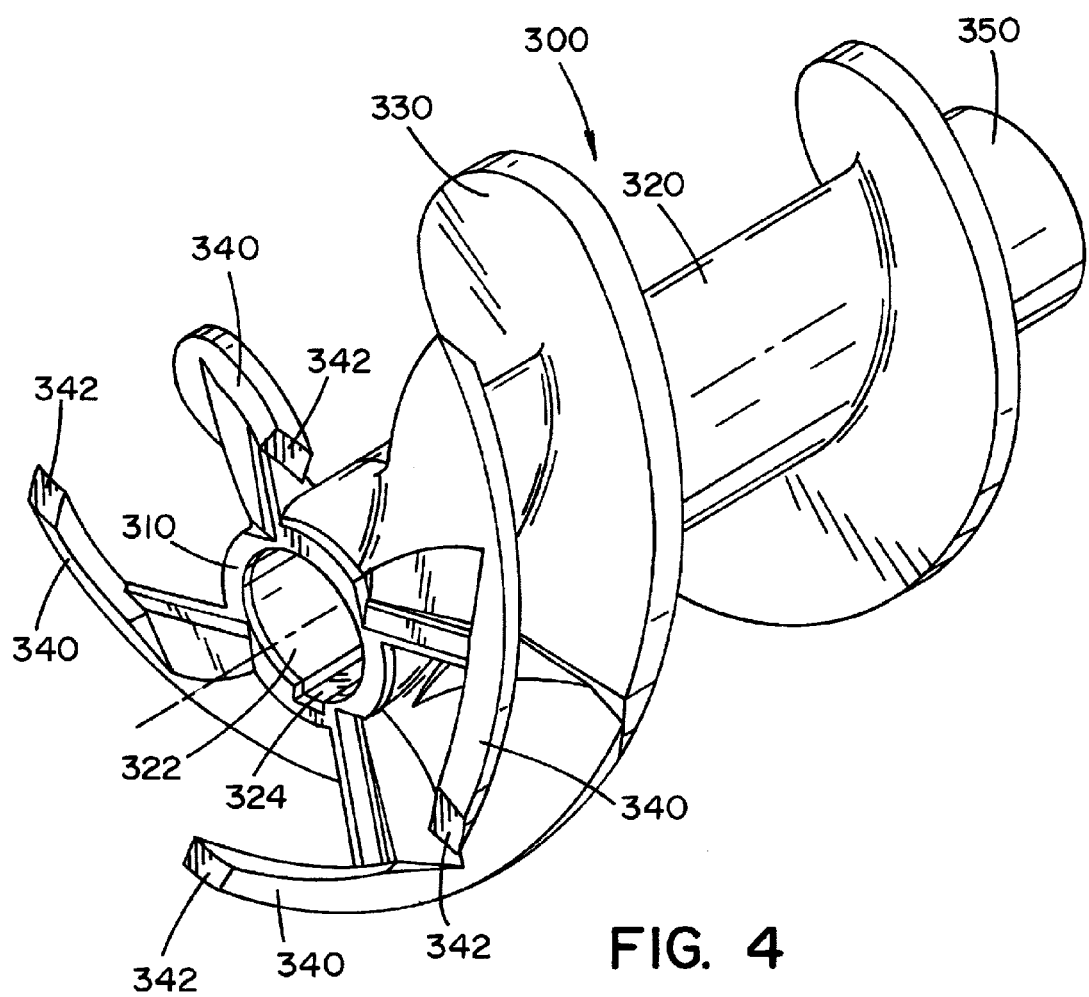
FIG. 4 is a side elevation view of a screw element that is positioned in the vent block; and, FIG. 5 is side sectional view of an alternative configuration of the vent block.

The vent block 100 is illustrated as having a generally cubical shape; however, this is not required. The materials used to form the components of the vent block are non-limiting (e.g., metal, plastic, composite materials, glass, ceramic, etc.). As illustrated in FIGS. 2 and 3, the first barrel liner is connected to the feed wall 110 of the vent block. The outer surface 112 of the feed wall can optionally include a flange recess 114 to receive a portion of second flange 48 on the first barrel liner. The feed wall includes a feed opening 117 to enable the vent block to be in fluid communication with the cavity of the first barrel liner so that material can be fed into the vent block from the first barrel liner as the first auger rotates in the cavity of the first barrel liner. The rear end 36 of the first auger is illustrated as passing partially or fully through the feed wall and engaging and connecting to a front end 310 of screw element 300 in the vent block. As can be appreciated, the front end of screw element 300 can alternatively extend partially or fully through the feed wall and engage and connect to the rear end of the first auger. The rear end of the first auger is illustrated as tapered so as to reduce the cross-sectional size of the root portion 32 to match or closely match the cross-sectional size of the root portion 320 of the screw element; however, this is not required. The taper, when used, can be at a constant or variable angle. A portion or all of root portion 320 can include a cavity 322 as illustrated in FIG. 4; however, this is not required. When a cavity 322 is present at least in the front portion of the screw element, the cavity can be designed to telescopically receive a rear portion of the first auger when the first auger is connected to the screw element; however, this is not required. The cavity located in the front portion of the screw element, when used, can optionally include a key arrangement 324 that is designed to align and/or lock the screw element in rotational alignment with the first auger so that the first auger and screw element rotate together; however, this is not required. The key arrangement can also or alternatively be used to secure the screw element to the first auger; however, this is not required. Key arrangement 324 is illustrated as in the form of a slot or recess; however, it can be appreciated that other or additional structures can be used.

An inner feed ring 130 is connected to the inner surface 116 of the feed wall of the vent block. The inner feed ring can be formed of one or more pieces. Bolt 132 is illustrated as passing through a bolt opening 134 in the inner feed ring and into a bolt opening 118 in the inner surface of the feed wall. The one or more bolts 132 are used to secure the inner feed ring to the inner surface of the feed wall. As can be appreciated, other or additional connection arrangements can be used to secure the inner feed ring to the inner surface of the feed wall (e.g., rivet, adhesive, weld bead, solder, etc.). As can also be appreciated, the inner feed ring can be partially or fully formed in the feed wall; however, this is not required. The inner feed ring includes a feed flange 138 that extends into the vent cavity 150 of the vent block. The feed flange is designed to only partially extend into the vent cavity. Generally, the feed flange extends into the vent cavity at least about 0.1% of the total longitudinal length of the vent cavity, typically the feed flange extends into the vent cavity at least about 0.5% of the total longitudinal length of the vent cavity, more typically the feed flange extends into the vent cavity at least about 1% of the total longitudinal length of the vent cavity, still more typically the feed flange extends into the vent cavity at least about 2% of the total longitudinal length of the vent cavity, even more typically the feed flange extends into the vent cavity at least about 5% of the total longitudinal length of the vent cavity, and yet even more typically the feed flange extends into the vent cavity at least about 7% of the total longitudinal length of the vent cavity. Also, the feed flange generally extends into the vent cavity no more than about 50% of the total longitudinal length of the vent cavity, typically the feed flange extends into the vent cavity no more than about 30% of the total longitudinal length of the vent cavity, more typically the feed flange extends into the vent cavity no more than about 25% of the total longitudinal length of the vent cavity, still more typically the feed flange extends into the vent cavity no more than about 20% of the total longitudinal length of the vent cavity, and even more typically the feed flange extends into the vent cavity no more than about 15% of the total longitudinal length of the vent cavity. The feed flange generally forms an opening 140 that is the same cross-sectional shape and size as the opening 136 in the front end of the feed ring, and is centrally aligned with the central axis of opening 136; however, this is not required. As can be appreciated, the feed flange can be tapered to reduce or enlarge the cross-section size of opening 140 relative to opening 136; however, this is not required.

Cavity 150 of the vent block is partially or fully formed by an outer ring 160. The outer ring can be formed of one or more pieces. The second end 162 of the outer ring is illustrated as connected to the inner surface 182 of exit wall 180; however, this is not required. As can be appreciated, the outer ring can also or alternatively be connected to feed wall 110. As illustrated in FIG. 3, second end of the outer ring includes a mount flange 164 that includes a bolt opening 166. A body of a bolt 170 is illustrated as passing through bolt opening 166 and connecting in an opening 184 of exit wall 180. As can be appreciated, other or additional arrangements can be used to connect the outer ring to the inner surface 182 of the exit wall (e.g., weld bead, solder, rivet, adhesive, etc.). As can be appreciated, the outer ring can be partially or fully formed on the outer wall; however, this is not required.

Figure 5:
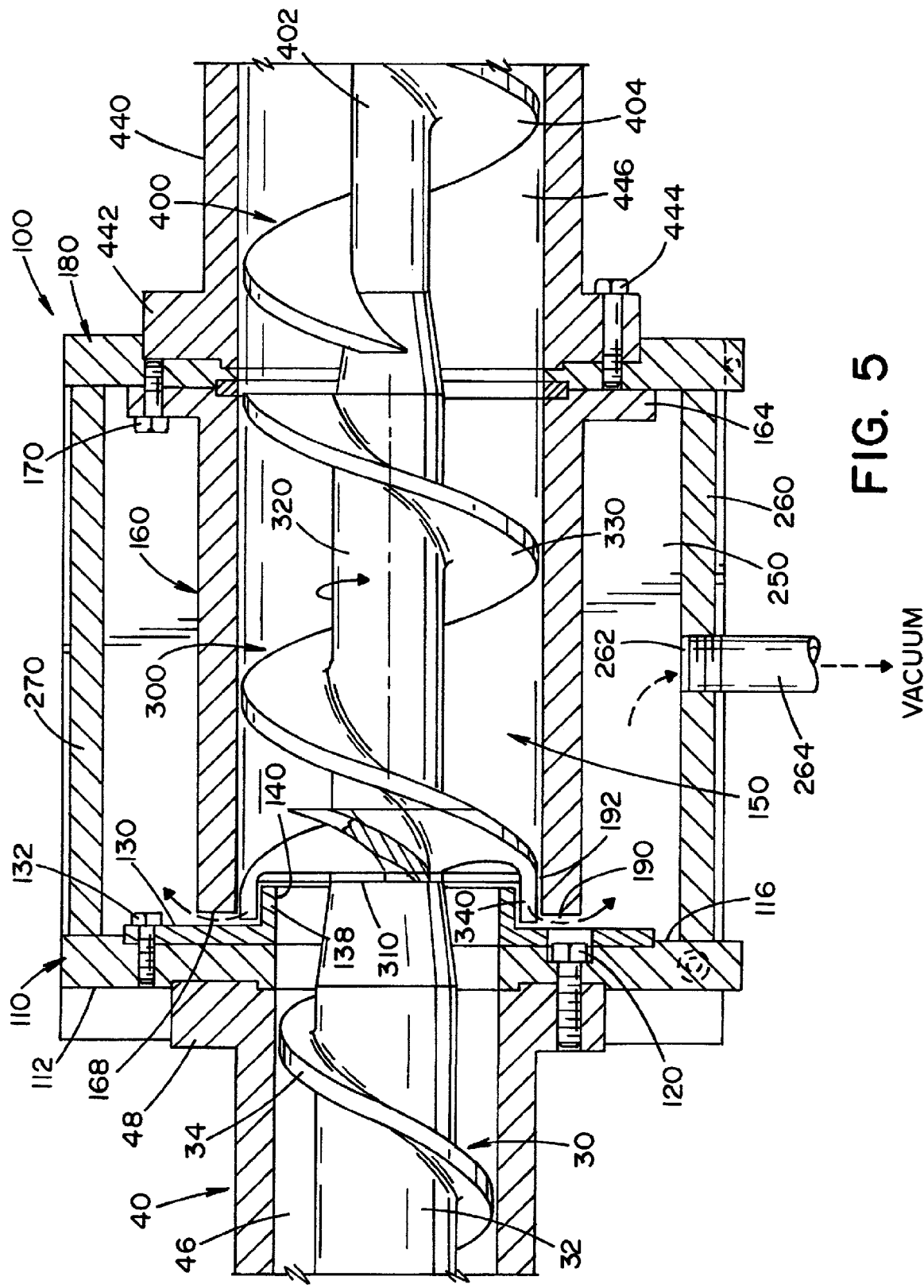

The cavity 150 of the vent block can have a constant or variable cross-sectional shape and cross-sectional size along the longitudinal length of the vent cavity. As illustrated in FIG. 3, the cross-section shape of the vent cavity is generally circular and remains generally constant along the longitudinal length of the vent cavity and the cross-sectional size of the vent cavity varies along the longitudinal length of the vent cavity. The cross-sectional size of the front portion 152 of the vent cavity at the feed wall of the vent block is illustrated as larger than the cross-sectional size of the end portion 156 of the vent cavity at the exit wall of the vent block. The cross-sectional size of the vent cavity can vary at a constant rate along the length of the vent cavity; however, this is not required. As illustrated in FIG. 3, the cross-sectional size of the vent cavity from the feed wall to more than 50% the longitudinal length of the vent cavity remains generally constant. Thereafter, the vent cavity tapers down at a taper portion 154 to a smaller cross-sectional size and then remains a constant small size for a short distance to the exit wall. As can be appreciated, many different vent cavity configurations can be used in the vent block. As illustrated in FIG. 5, the cross-section shape and cross-sectional size of the vent cavity is generally constant along the longitudinal length of the vent cavity.

Referring again to FIG. 3, the outer ring 160 has a first end 168 that is illustrated as spaced from the inner surface 116 of the feed wall. All or a portion of the first end can be spaced from the inner surface of the feed wall and/or the inner feed ring. In one arrangement, the complete first end of the outer ring is spaced from the inner surface of the feed wall and/or inner feed ring. In such an arrangement, the outer ring is fully supported on the inner surface of the exit wall. As can be appreciated, the outer ring could also or alternatively be supported on another wall of the vent block (e.g., top wall, bottom wall, side wall, etc.). In another arrangement, a portion of the first end of the outer ring is spaced from the inner surface of the feed wall and a portion of the first end contacts the inner surface of the feed wall and/or inner feed ring. In such an arrangement, a portion of the first end can be supported by, connected to and/or interconnected to the feed wall and/or inner feed ring; however, this is not required. The cavity gap 190 that is formed between the front end of the outer ring and the inner surface of the feed wall and/or inner feed ring is used to withdraw gas from the vent cavity as material is fed through the vent cavity. The size and/or shape of the space or gap 190 is non-limiting. As can be appreciated, the front portion of the outer ring can include one or more openings that can also or alternatively be used to withdraw gas from the vent cavity as material is fed through the vent cavity; however, this is not required. As illustrated in FIG. 3, the first end of the outer ring is spaced from the inner feed ring to form cavity gap 190.

As illustrated in FIG. 3, the first end of the outer ring extends over the feed flange 138 of the feed ring so as to cause an overlap arrangement between the inner feed ring and outer ring. The overlapping portion of the two rings forms a ring gap 192. The ring gap 192 in conjunction with the cavity gap 190 forms a gas path that enables gas to be withdrawn from the vent cavity. The width of the ring gap is generally constant; however, this is not required. The front end portion of the outer ring generally extends over or overlap about 0.1-99% of the longitudinal length of feed flange 138, typically, the front end portion of the outer ring generally extends over or overlap about 1-95% of the longitudinal length of feed flange 138, more typically the front end portion of the outer ring generally extends over or overlaps about 5-95% of the longitudinal length of feed flange 138, still more typically the front end portion of the outer ring generally extends over or overlaps about 10-95% of the longitudinal length of feed flange 138, even more typically the front end portion of the outer ring generally extends over or overlaps about 20-95% of the longitudinal length of feed flange 138, yet even more typically the front end portion of the outer ring generally extends over or overlaps about 25-95% of the longitudinal length of feed flange 138, yet still even more typically the front end portion of the outer ring generally extends over or overlaps about 30-95% of the longitudinal length of feed flange 138, even more typically the front end portion of the outer ring generally extends over or overlaps about 40-95% of the longitudinal length of feed flange 138, still more typically, the front end portion of the outer ring generally extends over or overlaps about 50-95% of the longitudinal length of feed flange 138, yet more typically the front end portion of the outer ring generally extends over or overlaps about 60-95% of the longitudinal length of feed flange 138, still more typically the front end portion of the outer ring generally extends over or overlaps about 60-90% of the longitudinal length of feed flange 138, and still yet even more typically the front end portion of the outer ring generally extends over or overlaps about 60-80% of the longitudinal length of feed flange 138.

As illustrated by the arrows in FIG. 3, gas is drawn out of the vent cavity thought ring gap 192, then through cavity gap 190 and into an outer chamber 250 of the vent block. The outer chamber fully or partially encircles and encompasses the vent cavity and outer ring. As illustrated in FIG. 3, the bottom wall 260 of the vent block includes a vacuum opening 262 that is used to draw gas from the outer chamber. A gas line 264 is connected to the vacuum opening and is generally connected to a vacuum pump, not shown, to draw a vacuum on the vent cavity. As can be appreciated, more than one vacuum opening can be positioned in the bottom wall. As also can be appreciated, one or more vacuum openings can also or alternatively be positioned in the top wall 270 and/or one or more side wall; however, this is not required. As can be appreciated, the top and bottom walls can be connected to the feed and exit walls in any number of ways (e.g., weld bead, solder, rivet, bolts, screws, etc.).

The vent block is generally designed to create a pressure drop as the material enters the vent cavity. The pressure drop is used to facilitate in inhibiting or preventing material being fed through the vent cavity from flowing into the ring gap and the cavity gap. The pressure drop in the cavity can be accomplished in one or more ways. As illustrated in FIG. 3, the front portion of the vent cavity has a cross-sectional size that is greater than the cross-sectional size of the feed flange 138. The larger cross-sectional size or area of the vent cavity results in the screw element being starved of material when the material is fed into the vent cavity. Because the front end 310 of screw element 300 is starved of material, the material more readily is fed forward of the ring gap and cavity gap thereby limiting or preventing material from plugging the ring gap and vent gap. As can be appreciated, the pressure drop in the front portion of the vent cavity can be accomplished in other or additional ways. For example, the cross-sectional size or area of the root portion of the screw element can be reduced at the front portion or all of the screw element to cause the material entering the vent cavity to be starved in the front section of the vent cavity. Also, the pitch of the flights 330 on the screw cavity can be changed to cause the front portion of the screw element to be starved with material entering the vent cavity, thus resulting in a pressure drop in at least the front portion of the vent cavity. One, two or all three of these configurations for the vent cavity and screw element can be used to achieve the pressure drop in at least the front portion of the vent cavity. As illustrated in FIG. 5, the vent cavity has a generally uniform cross-sectional shape and cross-sectional size or area along the complete longitudinal length of the vent cavity. For such a vent cavity configuration, the reduction in cross-sectional size or area of the root portion of the screw element and/or change in the pitch of the flights in the screw element can be used to achieve the pressure drop in at least the front portion of the vent cavity. Once the material in the vent cavity has been fed past the ring gap and cavity gap, the vent cavity and/or the screw element can be designed such that the screw element is not starved of material; however, this is not required. As illustrated in FIG. 3, the rear or back end of the vent cavity reduces in cross-sectional size or area, thereby causing the screw element in such region of the vent cavity to be less starved or not starved of material; however, this is not required. As can be appreciated, the vent cavity can be designed to a plurality of screw elements; however, this is not required.

The screw element can be designed to include one or more fingers 340 that are used to inhibit or prevent material from moving into and/or clogging the ring gap and/or cavity gap. The inclusion of one or more fingers on the screw element is optional. As illustrated in FIG. 4, the front end 310 of the screw element 300 includes four fingers 340. As can be appreciated, the screw element can include one, two, three, four or more fingers. The fingers are illustrated as connected to and extending from the flight 330 of the screw element. The fingers are sized and configured to fit at least partially in the ring gap 192 as illustrated in FIG. 3. As the screw element rotates as indicated by the arrow in FIG. 3, the fingers move within the ring gap and clear any material that may move into the ring gap. The constant clearing of material from the ring gap by the one or more fingers on the screw element facilitate in ensuring that the ring gap and cavity gap do not become clogged or plugged during the operation of the extruder arrangement. As illustrated in FIG. 3, the end portion of the fingers extends the full length of the overlapped region of the inner feed ring and outer ring; however, it can be appreciated that the end portion of the fingers extends only part of the full length of the overlapped region of the inner feed ring and outer ring. The width of the end portion of the fingers is generally less than the width of the ring gap (e.g., 50-99% the width, etc.) so that the fingers can easily and/or freely move within the ring gap; however, this is not required. The end portion of the fingers is illustrated in FIG. 3 as spaced from the inner feed ring; however, this is not required. The end portion of the fingers 340 can include a tapered region 342 that are designed to facilitate in the movement of the material out of the ring gap. The inclusion of a taper region on one or more of the fingers is optional.

Referring now to FIGS. 1-3 and 5, a second auger 400 is connected to the exit wall of the vent block. The general configuration of the second auger can be the same as the first auger; however, this is not required. The second auger includes a central root portion 402 and one or more flights 404 connected to the outside surface of the root portion. The flight 404 has a helical configuration and is designed to move material from the vent block. The second auger is connected to the second end of the screw element so that the first auger, screw element and second auger rotate together. The diameter of the root portion of the second auger is non-limiting. The diameter or the root portion can remain constant or vary along the longitudinal length of the second auger. The height and/or pitch of the one or more flights on the second auger can remain constant or vary along the longitudinal length of the second auger. The second auger can include one or more flight breaks along the longitudinal length of the second auger; however, this is not required.

A second barrel liner 440 can be formed of one or more parts. Typically, the second barrel liner is formed of two halves that are bolted or otherwise connected together. The material used to form the second barrel liner is non-limiting. The second barrel liner includes a first flange 442 that is connected by bolts 444 or some other or additional connection arrangement (e.g., threaded connection, rivet, adhesive, etc.) to the exit wall of the vent block. Although not shown, the second barrel liner can optionally include a heating and/or cooling jacket and/or coils to heat and/or cool the material moving though the second barrel liner. The cross-sectional size and cross-sectional shape of the cavity 446 formed by the second barrel liner can be constant or vary along the longitudinal length of the second barrel liner. The longitudinal length of the second barrel liner is non-limiting. The second barrel liner can be designed to enable two or more augers to rotate within the cavity of the second barrel liner; however, this is not required. As illustrated in FIG. 1, the cross-sectional size and circular cross-sectional shape of the cavity formed by the second barrel liner is generally constant along the longitudinal length of the first barrel liner. Referring now to FIGS. 1-3, a first flange 442 on the first barrel liner is connected to the vent block 100 by bolts or some other or additional connection arrangement. The body of bolt 444 passes through a bolt opening 448 and secures to first flange to the exit wall of the vent block. As can be appreciated, other or additional arrangements can be used to secure the second barrel liner to the vent block. A third barrel liner 450 is illustrated in FIG. 1 to be connected to the second barrel liner; however, this is not required. As can be appreciated, additional barrel liners can be connected together in the extruder arrangement. A flange 449 of the second barrel liner is connected to a flange 452 of the third barrel liner by bolts 460. Although not shown, a die plate can be connected to the end of the third barrel liner; however, this is not required. As also can be appreciated, a third auger, not shown, can be connected to the second auger.

The cross-sectional shape and cross-sectional size or area of the cavity of the second barrel is generally the same as the opening 188 in the exit wall 180 of the vent block; however, this is not required. The cross-sectional shape and cross-sectional size or area of the opening in the inner feed ring is also generally the same as the opening 188 in the exit wall 180 of the vent block; however, this is not required. The second end portion 350 of the screw element can be tapered; however, this is not required. The second end portion of the screw element can be configured to be connected to the second auger in a similar manner as the first end portion of the screw element and is connected to the first auger; however, this is not required. The first end portion 410 of the second auger 400 is illustrated as tapered to transition from the larger cross-sectional size of the root section of the screw element to the small cross-sectional size of the root element on the second auger; however, the use of a tapered section is not required. As can be appreciated, the cross-sectional size of the root section of the screw element can be the same or greater than the cross-sectional size of the root section of the screw element.

A sealing ring 470 can optionally be used to create a seal between the second barrel and the vent block; however, this is not required.

Referring again to FIG. 1, the vent block includes first and second side walls 280, 290. One or both side walls can be designed to be hingedly connected to the vent block; however, this is not required. As illustrated in FIG. 1, a screw or bolt 282 is used to secure the side wall in the closed position. As can be appreciated, other or additional arrangements can be used to secure the one or both side walls in the closed position (e.g., latch, lock, rivet, screw, adhesive, weld bead, solder, magnet, etc.). A sealing arrangement (e.g., sealing ring, etc.) can be used to facilitate in forming a seal with the side walls and/or one or more of the other walls of the vent block to facilitate is maintaining a vacuum in the vent block; however, this is not required. One or both side walls can include a viewing panel 284 to enable a user to view the interior of the vent block; however, this is not required. The viewing panel, when used, enables a user to see if the ring gap and/or cavity gap have become plugged with material. If one or both gaps have become plugged, one or both side walls can be opened and one or both gaps can be cleared by a user. The vent block can also or alternatively include and/or be used with one or more pressure sensors that can be used to determine if the ring gap and/or cavity gap have become partially or fully clogged or plugged; however, this is not required.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

I claim:

1. An extruder for feeding material and for removing gas from the fed material, said extruder comprising:
   an entrance for feeding the material into said extruder;
   a first auger rotatably positioned in a first barrel liner;
   a second auger rotatably positioned in a second barrel liner; and,
   a vent block positioned between said first and second auger, said vent block including a vent cavity having a feed end and an exit end, an inner feed ring that partially extends into said vent cavity at said feed end of said vent cavity, and a screw element rotatably positioned in said vent cavity, a first end of said screw element connected to or interconnected to said first auger, a second end of said screw element connected to or interconnected to said second auger, at least a majority of said vent cavity formed by an outer ring, a front portion of said outer ring having a cross-sectional size that is greater than a cross-sectional size of a front end of said inner feed ring, at least a portion of a front end of said outer ring is longitudinally aligned with or overlapping said front end of said inner feed ring, said outer ring forming at least one gap or opening at or adjacent said feed end of said vent cavity to enable a vacuum to be pulled on said vent cavity as the material is moved though said vent cavity from said feed end to said exit end by said screw element.

2. The extruder as defined in claim 1, wherein said front end of said outer ring overlaps said front end of said inner feed ring, said front end of said outer ring spaced from said feed end of said cavity to form said at least one gap or opening.

3. The extruder as defined in claim 1, wherein said screw element includes a root portion that extends along the longitudinal length of the screw element and a helically shaped flight connected to an outer surface of said root portion, a height of said flight greater at said first end of said screw element greater than a height of said flight at said second end of said screw element.

4. The extruder as defined in claim 1, wherein said screw element includes a root portion that extends along the longitudinal length of the screw element, a helically shaped flight connected to an outer surface of said root portion and a finger, said finger positioned at or adjacent to said first end of said screw element, said finger configured to be positioned in said at least one gap or opening defined by said front portion of said outer ring that overlaps said inner feed ring.

5. The extruder as defined in claim 1, including a viewing window on a vent block wall, said viewing window positioned on said view box to enable viewing of said at least one gap or opening.

6. A vent block designed to enable a vacuum to be pulled on material flowing through the vent block, said vent block comprising a vent cavity having a feed end and an exit end, an inner feed ring that partially extends into said vent cavity at said feed end of said vent cavity, and a screw element rotatably positioned in said vent cavity, a first end of said screw element designed to be connected to interconnected to a first auger, a second end of said screw element designed to be connected to interconnected to a second auger, at least a majority of said vent cavity formed by an outer ring, a front portion of said outer ring having a cross-sectional size that is greater than a cross-section size of a front end of said inner feed ring, at least a portion of a front end of said outer ring is longitudinally aligned with or overlapping said front end of said inner feed ring, said outer ring forming at least one gap or opening at or adjacent said feed end of said vent cavity to enable a vacuum to be pulled on said vent cavity as the material is moved though said vent cavity from said feed end to said exit end by said screw element.

7. The vent block as defined in claim 6, wherein said front end of said outer ring overlaps said front end of said inner feed ring, said front end of said outer ring spaced from said feed end of said cavity to form said at least one gap or opening.

8. The vent block as defined in claim 6, wherein said screw element includes a root portion that extends along the longitudinal length of the screw element and a helically shaped flight connected to an outer surface of said root portion, a height of said flight greater at said first end of said screw element greater than a height of said flight at said second end of said screw element.

9. The vent block as defined in claim 6, wherein said screw element includes a root portion that extends along the longitudinal length of the screw element, a helically shaped flight connected to an outer surface of said root portion and a finger, said finger positioned at or adjacent to said first end of said screw element, said finger configured to be positioned in said at least one gap or opening defined by said front portion of said outer ring that overlaps said inner feed ring.

10. The vent block as defined in claim 6, including a viewing window on a vent block wall, said viewing window positioned on said view box to enable viewing of said including gap formed by said outer ring.

11. An extruder for feeding material and for removing gas from the fed material, said extruder comprising:
an entrance for feeding the material into said extruder;
a first auger rotatably positioned in a first barrel liner;
a second auger rotatably positioned in a second barrel liner; and,
a vent block, said vent block including a vent cavity having a feed end and an exit end, an inner feed ring, an outer ring and a screw element, said inner feed ring partially extends into said vent cavity at said feed end of said vent cavity, said screw element rotatably positioned in said vent cavity, a first end of said screw element connected to or interconnected to said first auger, a second end of said screw element connected to or interconnected to said second auger, a front portion of said outer ring having a cross-sectional size that is greater than a cross-sectional size of a front end of said inner feed ring, at least a portion of a front end of said outer ring is longitudinally aligned with or overlapping said front end of said inner feed ring, said outer ring and said inner feed ring forming at least one gap or opening.

12. The extruder as defined in claim 11, wherein said front end of said outer ring overlaps at least a portion of said front end of said inner feed ring, said front end of said outer ring spaced from said feed end of said cavity.

13. The extruder as defined in claim 12, wherein at least a majority of said vent cavity formed by an outer ring.

14. The extruder as defined in claim 13, wherein said vent cavity, said screw element, or combinations thereof are configured to cause said vent cavity to be at least partially starved of material as said material is passed though said vent cavity, said outer ring having a variable cross-sectional area along a longitudinal length of said outer ring.

15. The extruder as defined in claim 14, wherein said screw element includes a root portion that extends along the longitudinal length of the screw element and a helically shaped flight connected to an outer surface of said root portion, a height of said flight at said first end of said screw element greater than a height of said flight at said second end of said screw element.

16. The extruder as defined in claim 15, wherein said screw element includes a finger, said finger positioned at or adjacent to said first end of said screw element, said finger configured to be positioned in said at least one gap or opening.

17. The extruder as defined in claim 16, wherein said vent block includes a viewing window on a vent block wall.

* * * * *